(12) United States Patent
Borovikov et al.

(10) Patent No.: US 10,864,446 B2
(45) Date of Patent: Dec. 15, 2020

(54) AUTOMATED PLAYER CONTROL TAKEOVER IN A VIDEO GAME

(71) Applicant: Electronic Arts Inc., Redwood City, CA (US)

(72) Inventors: Igor Borovikov, Foster City, CA (US); Mohsen Sardari, Redwood City, CA (US); John Kolen, Foster City, CA (US); Navid Aghdaie, San Jose, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/367,139

(22) Filed: Mar. 27, 2019

(65) Prior Publication Data
US 2020/0306643 A1 Oct. 1, 2020

(51) Int. Cl.
*A63F 13/355* (2014.01)
*A63F 13/79* (2014.01)
*A63F 13/67* (2014.01)
*A63F 13/77* (2014.01)

(52) U.S. Cl.
CPC .............. *A63F 13/79* (2014.09); *A63F 13/67* (2014.09); *A63F 13/77* (2014.09)

(58) Field of Classification Search
CPC .... A63F 13/355; A63F 13/358; A63F 13/422; A63F 13/493; A63F 13/55; A63F 13/56; A63F 13/67; A63F 13/79; A63F 2300/208; A63F 2300/534; A63F 2300/6027; A63F 2300/6054
See application file for complete search history.

(56) References Cited

U.S. PATENT DOCUMENTS

| | | | |
|---|---|---|---|
| 10,286,322 B1 | 5/2019 | Wakeford et al. | |
| 10,300,379 B1 | 5/2019 | Wakeford et al. | |
| 2006/0154710 A1* | 7/2006 | Serafat | A63F 13/10 463/1 |
| 2006/0246972 A1 | 11/2006 | Thomas et al. | |
| 2007/0298886 A1 | 12/2007 | Aguilar, Jr. | |
| 2014/0274297 A1 | 9/2014 | Lewis et al. | |
| 2018/0256981 A1* | 9/2018 | Enomoto | A63F 13/67 |
| 2019/0060766 A1* | 2/2019 | Perry | G06N 3/006 |

OTHER PUBLICATIONS

U.S. Appl. No. 15/985,347, filed May 21, 2018.

* cited by examiner

*Primary Examiner* — Omkar A Deodhar
(74) *Attorney, Agent, or Firm* — Knobbe, Martens, Olson & Bear, LLP (57) ABSTRACT

Systems and methods are disclosed for converting a player-controlled character or virtual entity in a video game to at least temporarily be under emulated control when certain criteria is met, such as when the player's device has lost its network connection to a game server. The character or virtual entity may continue to behave in the game in a manner that emulates or mimics play of the actual player until the end of the game session or until the underlying connection problem or other issue is resolved, such that other players participating in the game session have the same or similar gameplay experience as they would have had if the disconnected player had continued to play.

20 Claims, 5 Drawing Sheets

AUTOMATED PLAYER CONTROL TAKEOVER IN A VIDEO GAME

INCORPORATION BY REFERENCE TO ANY PRIORITY APPLICATIONS

Any and all applications for which a foreign or domestic priority claim is identified in the Application Data Sheet as filed with the present application are hereby incorporated by reference.

BACKGROUND

Video game applications have increased in popularity and complexity in recent years. Many of the popular video games in recent years are multiplayer online games, in which players each utilize their own mobile phones, console systems, personal computers or other gaming devices to play with and/or against other real players in real time. In a typical online multiplayer game, each player's gaming device communicates over the Internet with a server associated with the given video game. The server is often responsible for maintaining shared game state and/or virtual environment data that reflects the interactions of the various players with the game and the virtual environment in which the players interact.

Often a multiplayer game enables multiple remotely located players to play together in a cooperative manner, such as on the same team, party, clan, or other grouping. If one of the players is unable to continue playing at a certain point during a cooperative gameplay session, the remaining players are typically frustrated and at a disadvantage relative to if the player had kept playing (e.g., their team may now only have three actively playing players in a matchup against four competing players on another team). Common reasons that a player may be unable to continue playing in the middle of a gameplay session in an online gaming environment include that the player's device may lose a network connection to the server, the player's device may experience excessive network lag that prevents proper gameplay, or that a game application operating on the player's device may crash or freeze.

SUMMARY OF EMBODIMENTS

The systems, methods, and devices of this disclosure each have several innovative aspects, no single one of which is solely responsible for the all of the desirable attributes disclosed herein.

In some embodiments, a system may include a data store that stores a player imitation model associated with one or more video games, wherein the player imitation model comprises indications of actions taken by a player in each of a plurality of gameplay situations. The system may further include a computing system in electronic communication with the data store and configured to execute computer-readable instructions that configure the computing system to: initiate a hosted instance of a multiplayer video game, wherein the hosted instance of the multiplayer video game includes a plurality of virtual characters interacting in a virtual environment, wherein a first player computing device initially controls a first virtual character, and wherein at least one additional virtual character other than the first virtual character is initially controlled by one or more other player computing devices; while the hosted instance of the multiplayer video game is in a first game state, receive player control commands from at least the first player computing device; generate a first updated game state for the hosted instance of the multiplayer video game based on at least the player control commands; provide information associated with the first updated game state to the one or more other player computing devices; update the player imitation model based on the first game state and the player control commands from the first player computing device; detect a connection problem between the computing system and the first player computing device, wherein the connection problem comprises at least one of a lost network connection, a network lag that meets a threshold, or an unexpected lack of control commands originating from the first player computing device; based on the connection problem, switch the first virtual character to be under automated control by the computing system instead of control by the first player computing device; determine an emulated control command with respect to at least the first virtual character based on the first updated game state and the player imitation model; generate a second updated game state for the hosted instance of the multiplayer video game based on at least the emulated control command; and provide information associated with the second updated game state to the one or more other player computing devices.

The computer system above can have one, all, or any combination of the following features. The computing system may be further configured to generate the player imitation model based on automated analysis of a plurality of in-game actions performed as a result of player control commands input by the player over a first time period, wherein the player utilizes the first player computing device and wherein the player imitation model is specific to the player. The first time period may comprise a plurality of instances of the multiplayer video game, the plurality of instances including the hosted instance of the multiplayer video game. The first time period may be configurable by the player, and the computing system may be further configured to generate a user interface that enables the player to select (a) a time period or (b) one or more previous game instances to be considered by the computing system when generating the player imitation model. The computing system may be further configured to maintain a heartbeat protocol associated with a connection between the computing system and the first player computing device, wherein the connection problem is detected based at least in part on the heartbeat protocol.

In some embodiments, the computing system may be further configured to: detect that the connection problem between the computing system and the first player computing device is resolved; return the first virtual character to be under control of the first player computing device instead of under automated control by the computing system; and generate a third updated game state for the hosted instance of the multiplayer video game based on one or more player control commands from at least the first player computing device. The player imitation model may be one of a plurality of player imitation models stored in the data store, wherein each of the plurality of player imitation models comprises indications of actions taken by the player in different instances of the multiplayer video game.

In some embodiments, a computer-implemented method may include, under the control of a computer system comprising computer hardware, the computer system configured with computer executable instructions: initiating an instance of a multiplayer video game, wherein the instance of the multiplayer video game includes a plurality of virtual entities interacting in a virtual environment, wherein a first player computing device initially controls a first virtual entity, and wherein at least one additional virtual entity other than the first virtual entity is initially controlled by one or more other player computing devices; while the instance of the multiplayer video game is in a first game state, receiving player control commands from at least the first player computing device; generating a first updated game state for the instance of the multiplayer video game based on at least the player control commands; providing information associated with the first updated game state to the one or more other player computing devices; detecting a control input problem associated with the first player computing device, wherein the control input problem comprises at least one of a lost network connection, a network lag that meets a threshold, an unexpected lack of control commands originating from the first player computing device, or a disconnected controller device associated with the first player computing device; based on the control input problem, determining an emulated control command with respect to at least the first virtual entity based on the first updated game state and a player imitation model, wherein the player imitation model comprises a trained model configured to receive a current game state of the multiplayer video game as input and to output an in-game action or command based on previously observed player behavior; generating a second updated game state for the instance of the multiplayer video game based on at least the emulated control command; and providing information associated with the second updated game state to the one or more other player computing devices.

The above computer-implemented method may further include one, all, or any combination of the following features. The first virtual entity may comprise at least one of a virtual character, a virtual object, a grouping of virtual in-game units, a virtual vehicle, or a virtual structure. The method may further include: detecting that the control input problem is resolved; returning the first virtual entity to be under control of the first player computing device; and generating a third updated game state for the instance of the multiplayer video game based on one or more player control commands from at least the first player computing device. The player imitation model may be trained at least in part in real time during the instance of the multiplayer video game, wherein at least a first portion of the previously observed player behavior is observed during the instance of the multiplayer video game. A second portion of the previously observed player behavior may be associated with commands received from the first player computing device in a previously played instance of the multiplayer video game. A second portion of the previously observed player behavior may comprise behavior of a plurality of players.

In some embodiments, a non-transitory computer-readable storage medium may have stored thereon computer-readable instructions that, when executed, configure a computing system to perform operations. The operations may include: initiating an instance of a multiplayer video game, wherein a first player computing device initially controls a first virtual entity in the multiplayer video game, and wherein at least one additional virtual entity other than the first virtual entity is initially controlled by one or more other player computing devices; while the instance of the multiplayer video game is in a first game state, receiving player control commands from at least the first player computing device; generating a first updated game state for the instance of the multiplayer video game based on at least the player control commands; providing information associated with the first updated game state to the one or more other player computing devices; detecting a connection problem associated with at least one of (a) a network connection between the computing system and a game application operating on the first player computing device or (b) a connection between the first player computing device and a game controller; based on the connection problem, determining an emulated control command with respect to at least the first virtual entity based on the first updated game state and a player imitation model, wherein the player imitation model comprises a trained model configured to receive a current game state of the multiplayer video game as input and to output an in-game action or command based on previously observed player behavior; and generating a second updated game state for the instance of the multiplayer video game based on at least the emulated control command.

The computer-readable medium above may further include one, all, or any combination of the following features. The operations may further comprise providing information associated with the second updated game state to the one or more other player computing devices. The operations may further comprise: detecting that the connection problem is resolved; returning the first virtual entity to be under control of the first player computing device; and generating a third updated game state for the instance of the multiplayer video game based on one or more player control commands from at least the first player computing device. The player imitation model may comprise a plurality of stackable levels that are each configured to determine a confidence score for a different action given the current game state of the multiplayer video game. The player imitation model may be configured to output an in-game action associated with a first checked level of the stackable levels that determines a confidence score meeting a threshold with respect to the current game state. The player imitation model may comprise a decision tree, a Markov model, or a deep neural network.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

Aspects of the present disclosure relate to effectively converting a player-controlled character in a video game to a non-player character (NPC) at least temporarily when certain criteria is met, such as when the player's device has lost its network connection to a game server or the network lag exceeds a threshold. The NPC may continue to behave in-game in a manner that emulates or mimics play of the actual player until the end of the game session or until the player comes back online, such that other players participating in the game session have the same or similar gameplay experience as they would have had if the disconnected player had continued to play.

Many video games include software-controlled virtual entities or characters, in addition to player-controlled virtual entities or characters. In video games, these software-controlled or programmatically controlled virtual entities may sometimes be referred to as computer players, bots, artificial intelligence ("AI") units, AI characters, or non-player characters (NPCs). NPCs can be programmed to respond to in-game stimuli (such as in game actions or occurrences involving other NPCs or player-controlled characters) in a manner that appears realistic to a human player. Traditionally, the behavior for a given NPC is typically programmed in advance as part of the game development process. However, aspects of the present disclosure include improved AI or NPC behavior modeling that can mimic or emulate a specific player's play during a given time period, such as a game session or across a number of game sessions.

According to aspects of the present disclosure, a player imitation model for a specific player may be dynamically constructed during one or more gameplay sessions based on a learning process that analyzes the player's control commands or actions taken in response to various game states. When a player imitation system as described herein determines that it should take over the player's controls during a game (such as in response to the system detecting that the player experienced a network disconnect), the trained player imitation model may be used by the player imitation system to emulate controls or actions based on the current game state that appear to other players to be controls or actions that the disconnected player would make if he were still connected and playing. Thus, a virtual character that was previously controlled by the player may appear to opponents and/or teammates in the game to still be controlled by the player, when in fact the virtual character is under automated control of the player imitation system.

As used herein, a game state may generally refer to data regarding the state of a game at a given snapshot instant, and may include different information depending on the type of game and manner in which the game's environment is represented in computer memory. Game state information can include game data such as character states, character actions, environment states, positional information about objects and/or characters in the game, non-positional information about characters and/or objects in the game, speeds, directions, health and other attributes, game modes, levels, and/or other information associated with a runtime state of a game application. For example, game state information may include, for each of potentially many virtual characters interacting in a virtual world (such as both player-controlled characters and NPCs), a character position, character orientation, current character action, attributes, and/or other information contributing to a state of a game application. The game state information can include dynamic state information that continually changes, such as character movement positions, and static state information, such as the identification of a game level or map within the game. In some embodiments, at least a portion of the game state information can be updated on a periodic basis, such as multiple times per second. In some embodiments, the game state information can be updated on an event-based basis. In some embodiments, game state information may be maintained asynchronously between individual player computing systems and a server that periodically sends updates to the player computing systems regarding game state information reflecting in-game actions of the various other players.

Overview of Player Imitation System and Operating Environment

Figure 1:
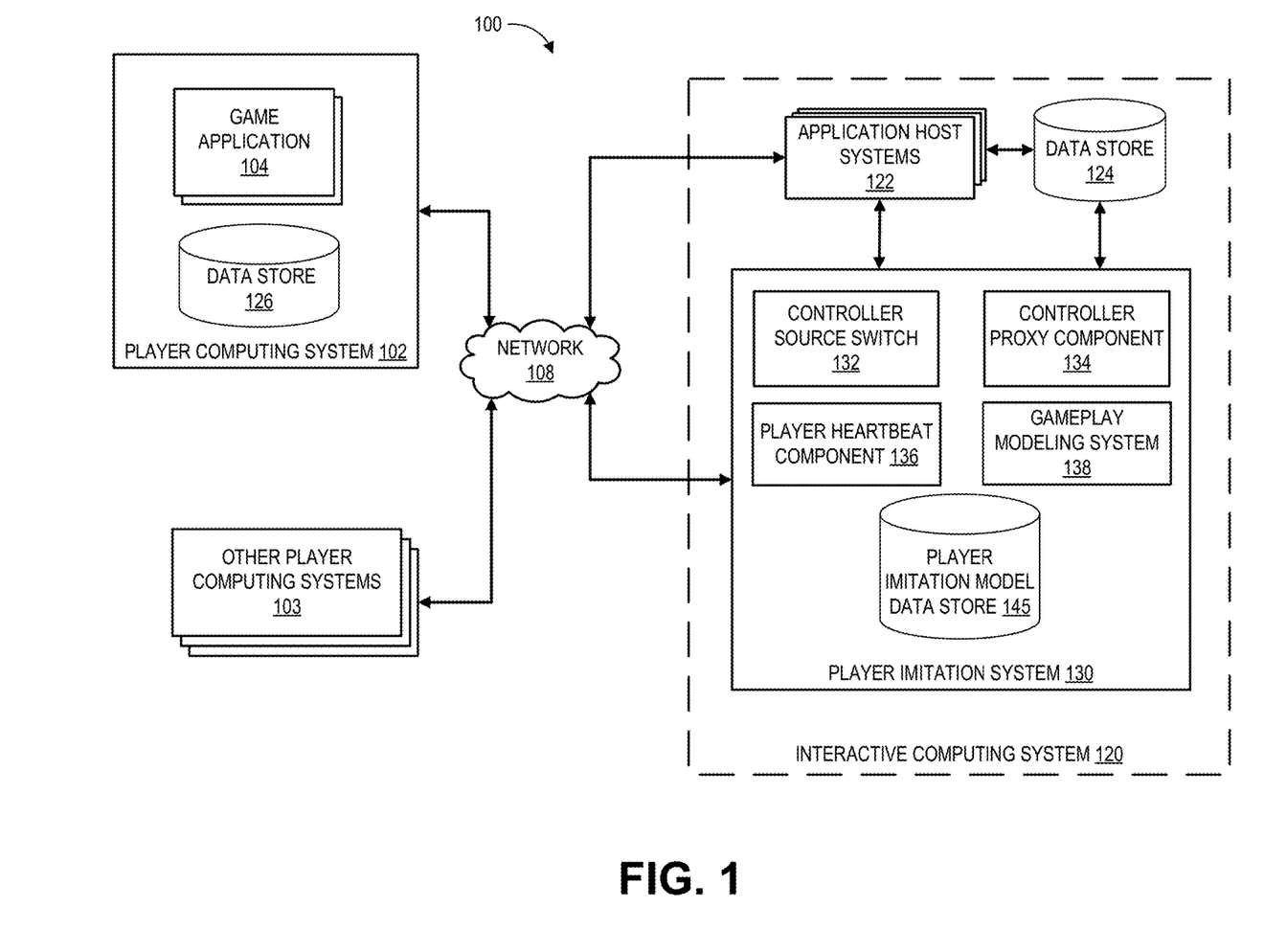
FIG. 1 illustrates an embodiment of a networked computing environment for implementing one or more embodiments of a player imitation system with proxy control features.

FIG. 1 illustrates an embodiment of a networked computing environment 100 for implementing one or more embodiments of a player imitation system 130 with proxy control features. The environment 100 includes a network 108, a player computing system 102, one or more other player computing systems 103, and an interactive computing system 120. To simplify discussion and not to limit the present disclosure, FIG. 1 illustrates only one interactive computing system 120, though multiple systems may be used.

The interactive computing system 120 can include application host systems 122, one or more data stores 124, and a player imitation system 130. The player imitation system 130 can communicate with data store 124 and/or with the application host systems 122 to acquire data associated with a game application and to provide automated player control takeover within a game application when a player experiences a network disconnect or other control problems discussed herein. The player imitation system 130 can additionally or alternatively communicate with player computing system 102 and/or one or more other player computing systems 103 through the network 108. Although only one network 108 is illustrated, multiple distinct and/or distributed networks may exist. The various systems and other components illustrated in FIG. 1, including interactions or communications between them, will now be described in more detail below.

A. Interactive Computing System

In the illustrated embodiment, the interactive computing system 120 includes application host systems 122, a data store 124, and a player imitation system 130. These systems may communicate with each other. For example, the player imitation system 130 can obtain data associated with a game application (such as game state information) from one or more of the application host systems 122 and can provide emulated control data to one or more application host systems 122. The application host systems 122 can communicate with the data store 124 to execute and/or host a game application. In certain embodiments, the interactive computing system 120 may be considered a game server that provides network-based support for single player or multiplayer video games played by players utilizing various player computing systems, such as player computing systems 102 and 103.

1. Application Host Systems

The application host systems 122 can be configured to execute a portion of the game application 104 operating on the player computing system 102 and/or a host application (not illustrated) on the interactive computing system 120. In certain embodiments, the application host systems 122 may execute another application instead of or in addition to executing a portion of the game application 104 and/or a host application, which may complement and/or interact with the game application 104 during execution of a gameplay session of the game application 104. An instance of a game that is executed based at least in part on an application host system interacting with one or more game applications on player computing systems may be referred to herein as a hosted instance of a game. Further details regarding application host systems are described below.

The interactive computing system 120 may enable multiple players or computing systems to access a portion of the game application 104 and/or a host application. In some embodiments, the portion of the game application 104 executed by application host systems 122 of the interactive computing system 120 may create a persistent virtual world. This persistent virtual world or virtual environment may enable one or more players to interact with the virtual world and with each other in a synchronous and/or asynchronous manner. In some cases, multiple instances of the persistent virtual world may be created or hosted by the interactive computing system 120. A set of players may be assigned to or may access one instance of the persistent virtual world while another set of players may be assigned to or may access another instance of the persistent virtual world. In some games, a set of players may cooperatively interact with each other within the same instance of a virtual world, such as being placed on the same team within an instance of a sports video game or being grouped together in a match, mission, quest, campaign or other cooperative mode in any of various types or genres of games.

In some embodiments, the application host systems 122 may execute a hosting system for executing various aspects of a game environment. For example, in one embodiment, the game application 104 may be a competitive game, such as a first person shooter or sports game, and the host application system 122 can provide a dedicated hosting service for hosting multiplayer game instances or facilitate the creation of game instances hosted by player computing devices. In some embodiments, the application host systems 122 can provide a lobby or other environment for players to virtually interact with one another. The in-game interactions between players within a game instance may vary widely depending on the type of game being played. For example, in one game a group of players may cooperatively work together to build a virtual city, while in another game, players may be placed into competitive sides that attempt to shoot each other in a combat simulation. Aspects of the present disclosure may provide benefits in nearly any genre of video game, such as shooter games (such as first person or third person shooters), survival games, adventure games, sports games, platform games, role playing games, simulation games, strategy games, racing games, etc.

2. Player Imitation System

As will be described in further detail herein, the player imitation system 130 can communicate with other systems to generate player imitation models for one or more specific players, detect when a player has disconnected or should otherwise have control taken over by the player imitation system, and emulate controls of a player using a configured player imitation model. The player imitation system 130 can include one or more systems, subsystems or components for implementing various functionality described herein. For example, the player imitation system 130 can include a controller source switch 132, controller proxy component 134, player heartbeat component 136, and gameplay modeling system 138. These example systems or components are not intended to be limiting, and the player imitation system 130 may include fewer or more systems or components than illustrated or described.

The player imitation system 130 and its various systems or components may be distributed across multiple computing systems. The various systems of the player imitation system 130 can communicate with each other to obtain, analyze and generate data. While various systems are illustrated as part of the interactive computing system 120 and/or player imitation system 130, it will be appreciated that each system's functionality could be implemented by a different or multiple computing systems or devices. Furthermore, a single system could implement functionality described herein as being provided or implemented by multiple systems in communication with each other. Similarly, functionality described as being provided by the player imitation system 130 of the interactive computing system 120 could instead be implemented at a player computing system 102, in other embodiments. Each system or component of the player imitation system 130 is described further below with respect to an illustrative data flow of FIG. 2.

The player imitation system 130 can include a player imitation model data store 145. The data store 145 can be configured to store player imitation models, such as models trained to receive a game state as input and to output a predicted action or control command that a real player would make given the game state. Player imitation models will be described in more detail below, and may include one or more generic models and one or more player-specific models, where the player-specific models may be developed based on specific time periods of gameplay data associated with the given player. The data store 145 may be distributed across multiple computing devices (see for example computing device 10 in FIG. 5). In some embodiments, the data store 145 may be a network-based storage system where data may be stored in different locations.

3. Data Store of Interactive Computing System

The interactive computing system 120 can include a data store 124. The data store 124 can be configured to store data acquired by other systems, such as, for example, telemetry data, video data, game state information, user data, or the like. In some embodiments, the data store 124 may store user account data associated with a video game publisher, a game platform provider or other service that enables a user to maintain preferences, virtual characters, avatars, achievements, and/or other data across a plurality of different video games. For example, account identifier data stored in data store 124 may be used by the player imitation system 130 to associate stored player imitation models with particular players' accounts. The data store 124 may be distributed across multiple computing devices (see for example computing device 10 in FIG. 5). In some embodiments, the data store 124 may be network-based storage system where data may be stored in different locations.

A. Player Computing Systems

Each of the player computing system 102 and the other player computing systems 103 can be controlled by a different user, such as different players of a video game. The player computing system 102 may include hardware and software components for establishing communications over a communication network 108. For example, the player computing system 102 may be equipped with networking equipment and network software applications (for example, a web browser) that facilitates communications via one or more networks (for example, the Internet or an intranet). The player computing system 102 may have varied local computing resources such as central processing units and architectures, memory, mass storage, graphics processing units, communication network availability and bandwidth, and so forth. Further, the player computing system 102 may include any type of computing system. For example, the player computing system 102 may include any type of computing device(s), such as desktops, laptops, game application platforms, game console systems, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few.

In some embodiments, the player computing system 102 may include one or more of the components or embodiments described below. In some embodiments, individual other player computing systems 103 may include similar components as the player computing system 102, though may also have differences (e.g., one player may play a given game from a mobile device while another player may play the same game on a desktop computer or game console system).

1. Game Application(s) and Host Application System

The player computing system 102 and each of the other player computing systems 103 may be capable of executing one or more game applications 104, which may be stored and/or executed locally and/or in a distributed environment. In a locally executed game application 104, generally, the game does not rely or utilize an external computing system (for example, the interactive computing system 120) to execute the game application. In some instances, a locally executable game can communicate with an external server to retrieve information associated with the game, such as game patches, game authentication, clouds saves, custom virtual character data, user account data, or other features. In distributed game applications, the player computing system 102 may execute a portion of a game and the interactive computing system 120, or an application host system 122 of the interactive computing system 120 may execute another portion of the game. For instance, the game may be a massively multiplayer online role-playing game (MMORPG) that includes a client portion executed by each of the player computing systems 102 and 103, and a server portion executed by one or more application host systems 122. For the present discussion, the type of game application 104 can be a locally executable game, a distributed application, or an application that includes a portion that executes on the player computing system 102 and a portion that executes on at least one of the application host systems 122.

2. Player Data Store

The player computing system 102 can include a data store 126. The data store 126 can be configured to store data associated with one or more game applications 104, local account data associated with an account maintained for the player by the interactive computing system 120, gameplay history data, and/or other game-related or account-related data. In some embodiments, the data store 126 may optionally store local copies of player imitation model data for the particular player (which may have been generated by the player imitation system 130) to enable the player to locally play against a previous version of himself, auto-play a portion of a single player game, and/or for other use in the absence of a network connection to the interactive computing system 120. The data store 126 may be distributed across multiple computing devices (see for example computing device 10 in FIG. 5).

B. Other Considerations

Although the various systems are described separately above, it should be noted that one or more of these systems may be combined together. For example, one or more of the systems may be executed by the same computing device (see for example, computing device 10 in FIG. 5) or by a different computing system than illustrated in FIG. 1. In some embodiments, the player imitation system 130 may be executed on the same computing device as the player computing system 102. On the other hand, one or more systems may be executed by multiple computing devices. For example, a portion or subsystem of the player imitation system 130 may be implemented by the player computing system 102 while another portion or subsystem may be implemented by a server.

Example Data Flow within Illustrative Operating Environment

Figure 2:
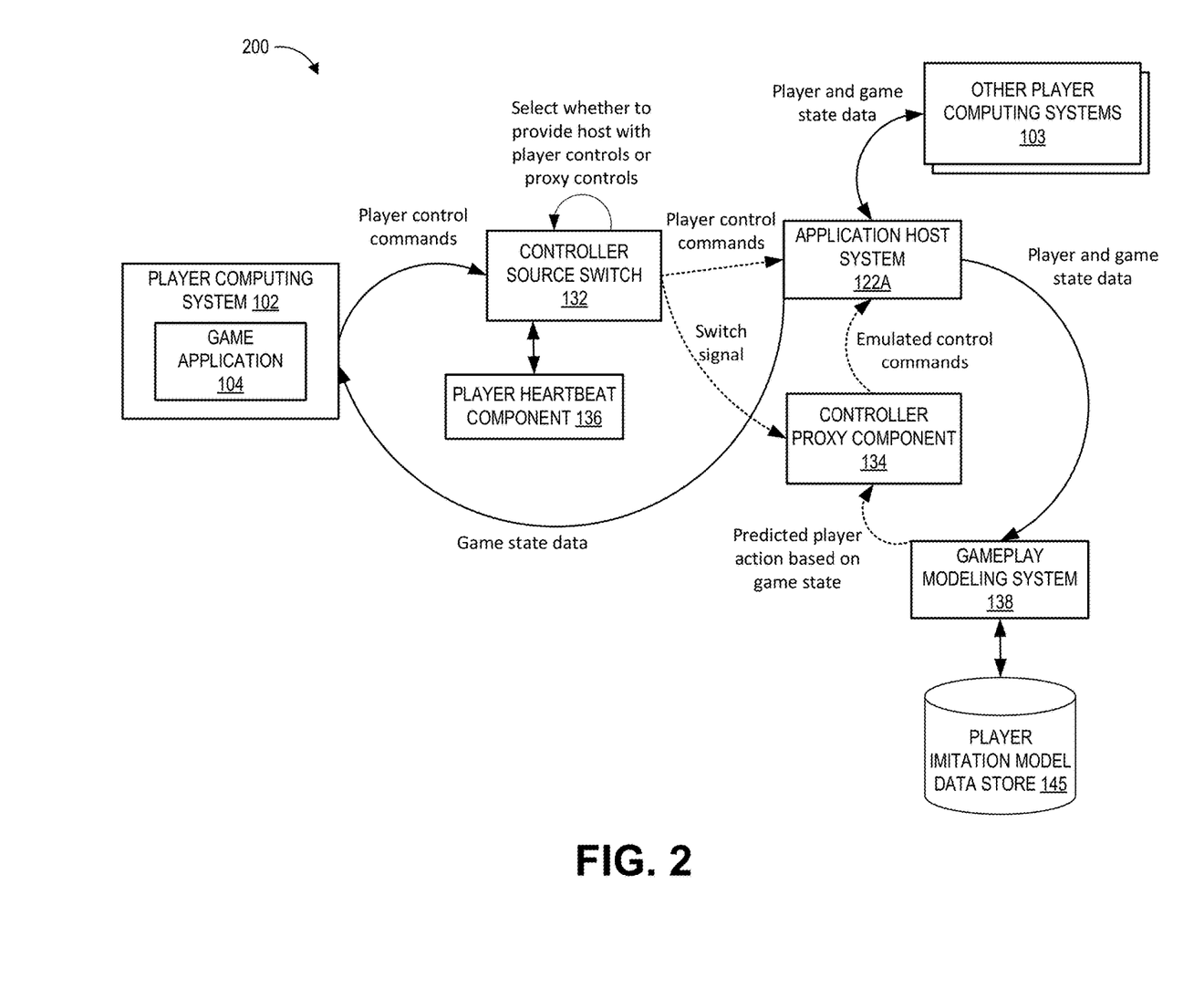
FIG. 2 illustrates example data flow within the networked computing environment of FIG. 1.

FIG. 2 illustrates example data flow within the networked computing environment of FIG. 1. For ease of illustration, the data flow of FIG. 2 does not specify whether individual communications between illustrated components or systems are over a network or are local within a single computing system or device. While one example network arrangement is illustrated in FIG. 1 and described above, it will be appreciated that components or subsystems illustrated as part of a single computing system in FIG. 1 (such as the systems and components of player imitation system 130) may instead be remotely located relative to each other. Similarly, other systems illustrated as in network communication with each other in FIG. 1 (such as player computing system 102 and player imitation system 130) may in some embodiments be operated together on a single computing system or may be in direct local communication with each other rather than communicating over a network.

As illustrated in FIG. 2, the player computing system 102 sends player control commands to an application host system 122A of the interactive computing system 120, which may be first received by (or received in parallel with or immediately after the application host system) a controller source switch 132 of the interactive computing system 120. The player may be playing an online multiplayer game application 104 that is configured to communicate with the application host system 122A to receive shared game state information that is affected in real time by the other player computing systems 103 that are executing their own copies of game application 104. Thus, the application host system 122A may enable other players in the multiplayer game to interact with the same instance of a virtual world as the player utilizing player computing system 102, and may continually update the current shared game state among the different player computing systems to reflect each of the players' interactions (as well as programmatic environment changes, NPC actions, etc.).

The player control commands can include, for example, directional inputs along a first axis (such as up/down) or provided to a first joystick (such as a left joystick), second directional inputs provided along a second axis (such as left/right) or provided to a second joystick (such as a right joystick), whether buttons (such as A, B, X, Y, Z, left bumper, right bumper, start, select, turbo, mouse clicks, finger taps, and the like) are pressed to cause a unit or character in the video game to perform an assigned action, and/or other input data. The player control commands can be provided through any of a variety of input devices and input formats, such as through a controller, through a mouse and keyboard, through voice commands, through a touchscreen, by gesture, and the like. In other embodiments, the actual button presses, mouse clicks, gestures or other information may be processed by the game application 104 locally at the player computing system 102 and translated into an in-game action (e.g., a virtual character firing a gun or turning 90 degrees left, a player selecting to deploy troops at certain in-game map coordinates, etc.), where this in-game action or other result of the player input is provided as the player control command(s) to the application host system.

While the controller source switch 132 is illustrated as a separate component from the application host system 122A, in some embodiments the controller source switch functionality may be integrated within the application host system 122A. The controller source switch 132 may select whether to provide the application host system 122A with either (a) player control commands received from the player computing system 102 or (b) emulated control commands generated by the controller proxy component 134. The controller source switch 132 may make the determination of which source should provide the control commands to the application host system based at least in part on a player heartbeat component 136. The player heartbeat component 136 may implement one or more heartbeat protocols that determine whether a consistent connection is maintained between the player computing system 102 and the interactive computing system 120. A heartbeat maintained by the player heartbeat component may fail, for instance, as a result of a network connection being lost or network lag exceeding a threshold established for playability of the particular game (e.g., the threshold may be greater for a slow playing or turn-based game than for a fast paced game involving frequent split second control decisions).

One or more additional or alternative connections monitored by the player heartbeat component may include monitoring whether a player control device or game controller remains plugged into or connected to the player computing system 102 (e.g., to detect whether a wired game controller was disconnected from the player computing system, such as may occur when someone trips over a cord). In some embodiments, the player heartbeat component may monitor an amount of time since the player pressed a button or otherwise entered a control command, and may compare the time to a threshold amount of time that may vary based on the game state. For example, if a player has not moved their virtual character for many seconds in a situation where movement is expected or the player's behavior deviates from expected behavior of the player (e.g., a game state in which the virtual character is being shot at and all of his teammates are running away), the player heartbeat component may indicate a control heartbeat failure to the controller source switch 132. Conversely, there may be another game state, such as a gameplay situation in which it makes sense within the game for the player to not issue any control commands (e.g., the virtual character is hiding from an enemy within the virtual environment), where the player heartbeat component may indicate a consistent control heartbeat despite many seconds of player control inactivity. As another example, the player heartbeat component may monitor a motion sensor or camera to identify that the player is no longer in view and presumably left his computing system (e.g., the player may have gotten up from his position playing the game to answer a doorbell at his home).

When the heartbeat component 136 has not identified any control failure or connection failure, the controller source switch 132 may simply pass any player control commands received from the player computing system 102 on to the application host system 122A to update the game state accordingly (such as updating the game state based on both the player's control commands and control commands received from other player computing system 103). The updated game state information may then be sent from the application host system 122A back to each of the player computing systems 102 and 103 for game applications executing on the respective player computing systems to display updated in-game views or content based on the new game state. The application host system 122A may additionally provide the player and game state data to the gameplay modeling system 138 to update a current player imitation model based on the player's most recent action(s) or control command(s) in response to the given game state, as will be further described below.

If instead the controller source switch 132 determines that the player computing system 102 has been disconnected or a heartbeat protocol otherwise fails, the controller source switch 132 may send a switch signal to the controller proxy component 134 indicating that the controller proxy component should take over control of the player's virtual character or other virtual unit(s) that the player was previously controlling in the game. The controller proxy component 134 may then obtain or request an emulated control command from the gameplay modeling system 138, which may generate the emulated control command based on the current game state obtained from the application host system 122A. The emulated control command may represent a predicted action that the player would take given the current game state, and may be based on past actions by the player (or another player) in one or more similar game states, as will be discussed further below.

The application host system 122A may then update the game state based on the emulated control command, which may include updating an action and/or positon of a virtual character or virtual unit of the player within a virtual environment of the game, and may send this updated game state information to the other player computing systems 103. The application host system 122A may continue receiving control commands for the player's virtual character from the controller proxy component 134 rather than the player computing system until the controller source switch determines to switch back to the player's control, such as by player commands being received and/or a controller or network connection being reestablished.

While FIG. 2 is described above in the context of a multiplayer online game, aspects of the present disclosure have benefits within single player games as well. For example, if a player is playing a game and their game controller or other input device disconnects, or a game application on their player computing system freezes (while a server-side application host continues executing the game instance), the player may desire to have his play style emulated until the player is able to reestablish control (so as to not die or lose within the game simply because of a short disconnect or control problem). In some single player embodiments (and/or in multiplayer embodiments), the controller source switch may enforce a time limit (e.g., two minutes) such that emulated controls will only be used until the earlier of expiration of the time limit or the player returning.

Illustrative Methods for Player Control Takeover

Figure 3:
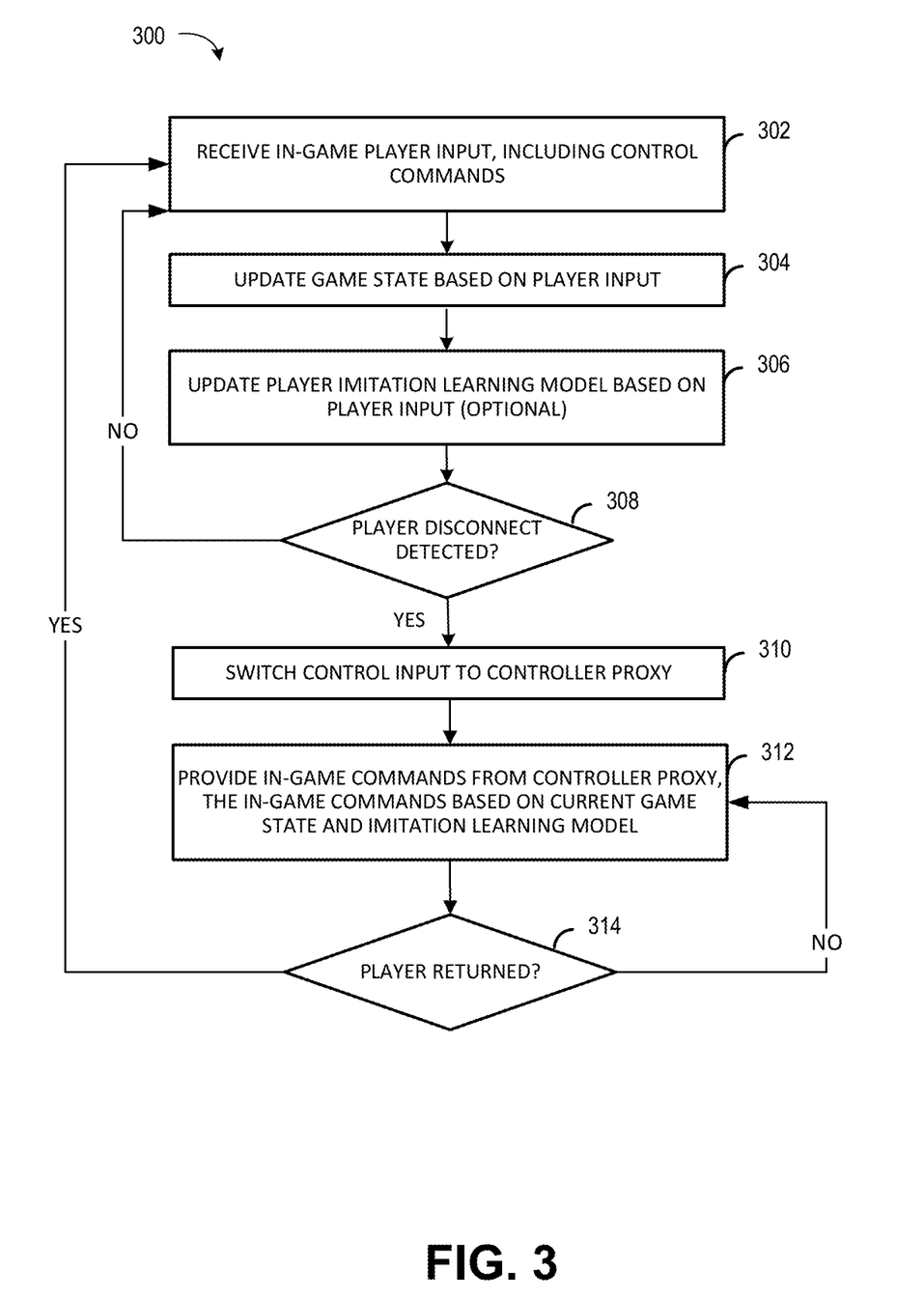
FIG. 3 is a flow diagram of an illustrative method for switching between updating a state of a video game instance based either on a player's control commands or on emulated controls from an imitation learning model, according to some embodiments.

FIG. 3 is a flow diagram of an illustrative method 300 for switching between updating a state of a video game instance based either on a player's control commands or on emulated controls from an imitation learning model, according to some embodiments. In some embodiments, the method 300, in whole or in part, can be implemented by a game application 104, a player imitation system 130, a player computing system 102, an interactive computing system 120, or other application component or module. Although any number of systems, in whole or in part, can implement the method 300, to simplify discussion, the method 300 will be described with respect to particular systems or components of the interactive computing system 120.

The illustrative method 300 may occur during a gameplay session or instance of a game. For example, prior to block 302, the interactive computing system 120 may initiate a game instance that includes one or more virtual characters or other in-game virtual units that are under control of a first player. The game instance may additionally include one or more other virtual characters or other in-game virtual units that are under control of one or more other players, who may be either competing against or cooperating with the first player within the game instance. The illustrative method 300 begins at block 302, where the game application 104 and/or application host system 122A may receive in-game player input, such as one or more control commands entered by the player as a result of pressing a key, pressing a button, clicking a mouse, making a gesture, and/or another action or combination of actions.

In some embodiments, the control command may be interpreted by the game application or application host system as an instruction for a specific in-game virtual entity under control of the player to perform one or more in-game actions (such as an action previously assigned to a given button pressed by the player). For example, in a basketball game, pressing a certain button may cause a virtual basketball player character to shoot a basket or jump to block an opponent's shot depending on the game state (e.g., depending on whether the virtual basketball player character has the ball or is on defense). As another example, the virtual entity under control of a character could be a grouping of a number of in-game virtual units, such as an army of soldiers in a war simulation game, which are launched into attack in a certain formation and with a certain target based on a set of commands entered by the player. Other types of virtual entities under control of the player could include, for example, a virtual object, a virtual vehicle (e.g., a car in a racing game) or a virtual structure.

At block 304, the application host system 122A may update the game state based on the player input, as discussed above. Given the basketball game example above, the updated game state may include data indicating that a shot was blocked and that a different virtual basketball player character now has possession of the ball, as well as updating game state data such as the team in possession of the ball, the positions of the various virtual basketball player characters on the court, the time remaining in the period, energy levels of the players, etc.

At block 306, the player imitation system 130 may update a player imitation learning model based on the player input and the game state in which that input was received. This block may be optional, such as in embodiments in which a model is trained in a batch process rather than dynamically throughout a gameplay instance. If block 306 is performed in the given embodiment and instance, the player imitation system 130 may update a player imitation model for the given player to reflect that the player entered the given control commands or requested the particular in-game action in the given game state. Model training will be described further below with respect to FIG. 4.

As one example, block 306 may include updating a Markov model to reflect updated player behavior statistics for the given game state or similar game states. For example, the model may be updated to reflect a higher likelihood than previously that the player will perform the given action or command in similar future game states (e.g., likelihood of jumping to block a shot when on defense and standing within a certain distance of a shooter on a certain portion of the court). As will be described below, different models may have various levels of quantization, rounding or abstraction applied to the game state. For example, a game state may be identified in the model very broadly such as "under imminent threat," or much more specifically such as "being shot at from 33 yards away with a pistol, while standing on higher ground than the shooter, partially covered, when armed with a grenade," etc.

At block 308, the interactive computing system 120, such as via the controller source switch 132 and/or player heartbeat component 136, may determine whether a player disconnect has been detected, such as a controller disconnect or network disconnect. As discussed above, the type of disconnect, problem, heartbeat failure or other occurrence that triggers a switch to using emulated controls may vary depending on the embodiment. For example, block 308 may include checking for instrument failure (e.g., a game controller was unplugged or lost wireless signal), a problem detected from a frame buffer (e.g., a game application on a player computing system is still displaying a loading screen when multiplayer gameplay has started), a visual detection or motion detection that a player left a room (e.g., based on camera or motion capture data), a lack of control input received when expected (e.g., the player's virtual character is standing still when the rest of his team's virtual characters are running in a strategic manner), a network disconnect or excessive network lag, and/or others.

If a disconnect or other problem is not detected at block 308, the illustrative method 300 returns to block 302 to continue receiving control commands from the player (e.g., via the player computing system 102). If instead a disconnect or other problem is detected at block 308, the illustrative method 300 proceeds to block 310, where the control input source for the player's virtual unit(s) is switched to the controller proxy component 134, as discussed above with respect to FIG. 2. As discussed above, the player imitation system 130 may then at block 312 begin providing in-game commands (such as commands to move the player's virtual unit, cause the player's virtual unit to perform a certain in-game action, etc.) from the controller proxy. As discussed, the emulated controls from the controller proxy may be determined based on the current game state and the imitation learning model that may be configured to mimic the player's likely actions in view of the current game state.

If the player returns, a network connection is reestablished, or other connection problem or control problem is resolved at block 314, the method 300 may loop back to block 302 to resume control of the player's virtual unit(s) by the player rather than using emulated controls. If the connection or control problem is not resolved at block 314, the method may loop back to block 312 to continue using emulated controls to control the player's virtual unit(s). The method 300 may continue looping as indicated until, for example, the game instance ends or the player's virtual unit(s) are eliminated from the game, in some embodiments.

Example Training and Use of Stackable Imitation Models

Figure 4:
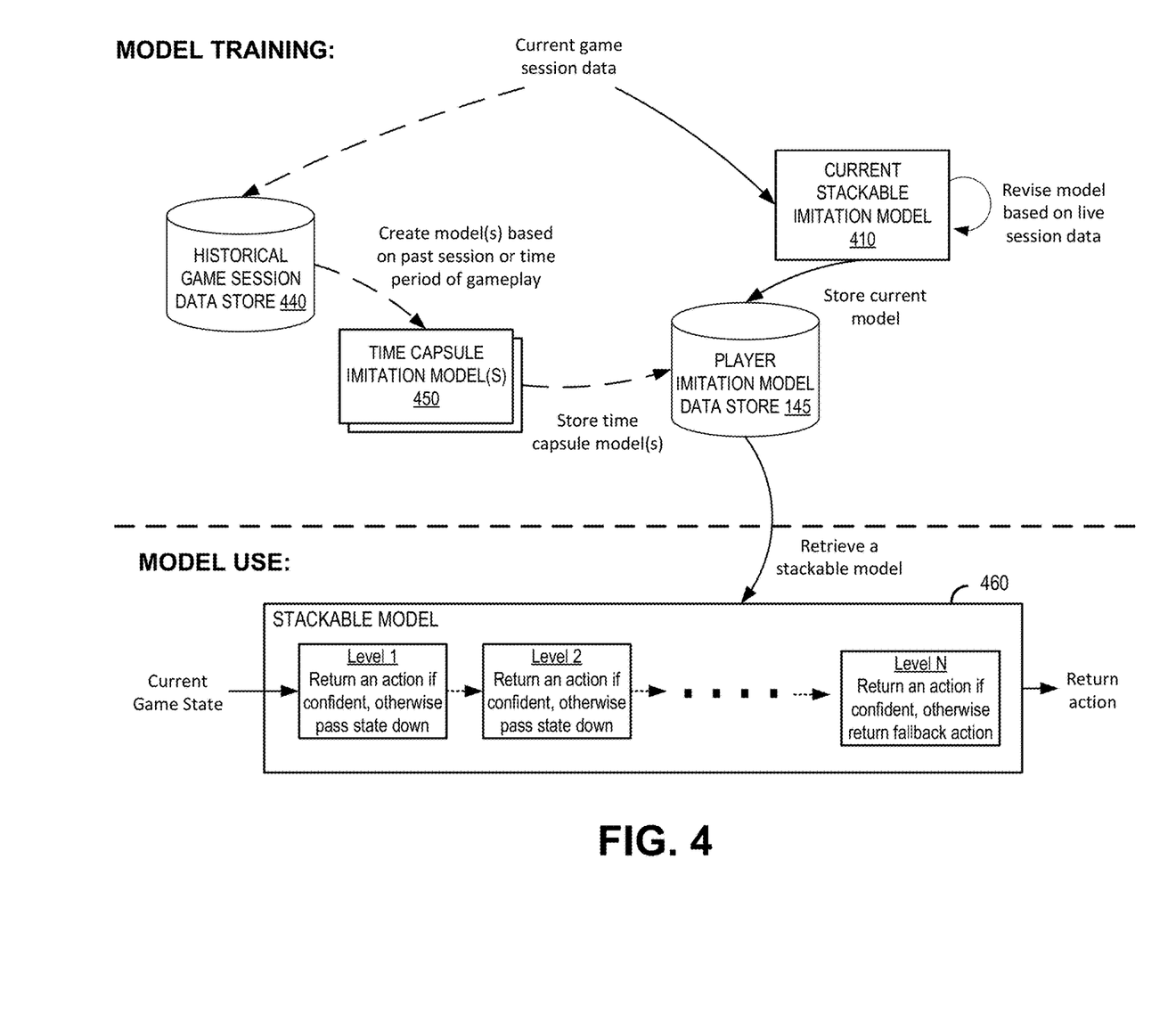
FIG. 4 provides an illustrative data flow of training and utilizing one or more player imitation models in the form of one or more stackable models generated based on a certain period of a player's gameplay data, according to some embodiments.

FIG. 4 provides an illustrative data flow of methods for training and utilizing one or more player imitation models in the form of one or more stackable models generated based on a certain period of a player's gameplay data, according to some embodiments. While FIG. 4 provides examples of certain models that may be employed in the present disclosure, it will be appreciated that various advantages of the automated player takeover features described herein may not be particular to any specific model type. For example, in some embodiments, a player imitation model that is not particular to a given player may be utilized, and could be programmatically created by a game developer rather than trained from gameplay data. In other embodiments, a player imitation model may include a decision tree, a Markov model, a deep neural network and/or other methods of modeling behavior or controlling an AI or NPC entity in a video game. Thus, the illustrative examples described below with respect to FIG. 4 should not be read as limiting the types of AI or behavioral models that may be employed by the gameplay modeling system 138 or player imitation model data store 145 in all embodiments.

As illustrated in FIG. 4, current game session data may be provided as input to train a current stackable imitation model 410, and/or may be provided to a historical game session data store 440 for storage. The game session data may include, for example, game state data, player input, actions taken, virtual environment data, and/or any other game data that may influence the player's choice of commands or actions in a given in-game situation. The current stackable imitation model 410, which may be trained in real time or dynamically during the game session or game instance, may be revised by the gameplay modeling system 138 based on the live game session data received. This may include applying quantization, compression, rounding or other manipulations to the raw game session data received, then updating statistics or likelihoods within a previously stored player imitation model based on the newly received action(s) or control command(s) entered in the current game state, as discussed above. Updating the stackable model may include adding a new stack or level to the model to incorporate a new rule based on the current game state. This approach may enable iterative building of a model in real time rather than implementing a full retraining of the model. The current stackable imitation model, including any updates, may be stored in player imitation model data store 145.

In some instances in which the newly received actions or control commands do not deviate from the prior model's predictions of how the player would behave in the current game state, no update may be needed to the model based on this new game session data. Depending on the embodiment, the current model prior to any update may be a model previously generated for this specific player, a model trained on gameplay data of a number of different players, or a generic model. Revision of the model may thus only occur, in some embodiments, to reflect a difference in the observed new behavior or action of the player relative to what the model would have previously predicted (either as a generic prediction for any player, or a prediction for this specific player, depending on the embodiment). In other embodiments, full statistics may be reflected within the model (e.g., the number of times the player was observed taking certain actions in each of a number of categories of game states), in which case an update may occur for each observed instance of an action.

Returning to discussion of the historical game session data store 440, this data store may include detailed gameplay data for a player across potentially a long time period (e.g., months or years) and potentially multiple underlying video games (e.g., both a first game and its sequel, as well as unrelated games). The level of detail stored may depend on a number of factors, including the complexity of the particular game, a subscription or plan level associated with a player's account with an operator of the interactive computing system 120, and/or other factors. For example, the historical game session data stored for one session may be sufficiently detailed for the player to play back a full replay of every action taken by the player. In a less detailed instance, the stored data may have been coarsened or quantized as discussed above prior to storage.

As illustrated, the historical game session data in data store 440 may be used by the player imitation system 130 to create one or more time capsule imitation model(s) 450 based on one or more part gameplay sessions or time periods of gameplay. In some embodiments, the interactive computing system 120 or player computing system 102 may generate a user interface enabling a player to make selections of the past gameplay sessions (e.g., requesting to create a model to imitate the player's best game performance ever) or time periods (e.g., requesting to create a model of the past three months or past 100 game sessions) to be used in generating a time capsule imitation model. In some instances, a decay value or decay function may be applied based on time, such that player behavior in more recent gameplay sessions is weighted more heavily in the model than player behavior in older gameplay sessions. Once generated, the time capsule imitation model(s) 450 may be stored in the player imitation model data store 145.

As shown in the model use section of FIG. 4, use of one of the stored imitation models in player imitation model data store 145 may involve the model being retrieved from the data store and provided with a current game state as input. In the illustrated example, the model is a stackable model in which higher priority actions or states have been stored in the lower numbered levels that are checked first within the model. For example, Level 1 may implicate a game state factor or rule that is very likely to override other game state factors or rules at lower levels (e.g., if a player's character is being shot at from close range, that may be sufficient game state information to determine a responsive action to run, even if the player's character has never been shot at in the particular current map location before or typically doesn't run when at the current map location).

As illustrated, the model may first determine a confidence score that the player would perform a particular action associated with Level 1 given the current game state and the rules or game state information associated with Level 1. If the confidence score meets a threshold, the model may stop progressing through the levels and may output the action determined at Level 1.

Otherwise, the model may progress through its levels, passing the current game state down to each successive stackable level until determining an action with a confidence score that meets the threshold. If the last level (identified as Level N in FIG. 4) is reached and fails to determine an action based on the current game state, a default or fallback action may be determined. In some embodiments, the fallback action may be to do nothing or to continue any previous action (e.g., keep walking in the current direction if the virtual character is already walking). In other embodiments, the model may pass the game state information to a generic model or other model to determine an action when the current player imitation model does not have a suggested action.

In addition to use in automated player takeover as discussed herein, the time capsule models discussed above may be selected by a player to play against herself (e.g., by loading a time capsule of hers to control an NPC opponent) or with herself (e.g., by loading a time capsule of hers to control an NPC teammate). In some embodiments, the player can make her time capsules shareable with other players, which may provide a way to practice against champions or particularly skilled players as they performed in the past or currently perform.

Overview of Computing Device

Figure 5:
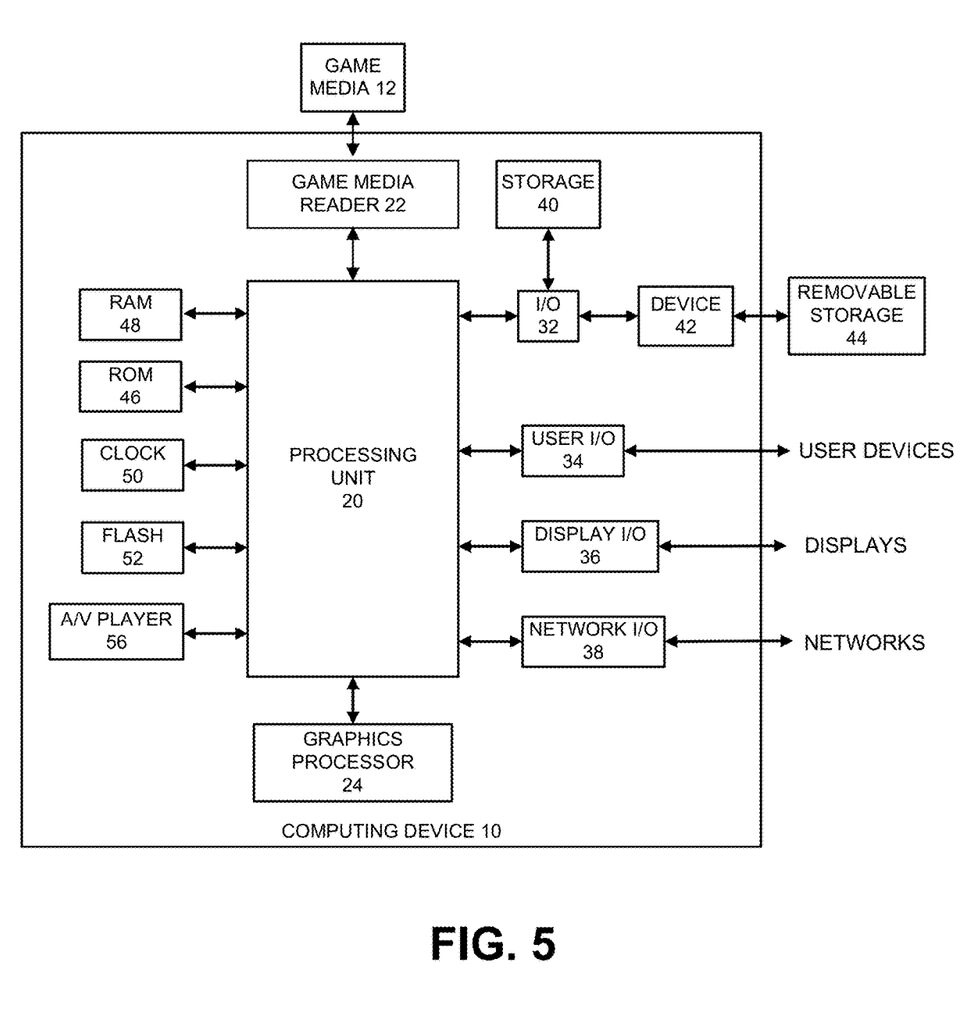
FIG. 5 illustrates an embodiment of a computing device that may implement aspects of the present disclosure.

FIG. 5 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers. In some embodiments, the player computing system 102 may include one or more of the components illustrated in FIG. 5, while in other embodiments, the interactive computing system 120 may include one or more of the components illustrated in FIG. 5.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
    a data store that stores a player imitation model associated with one or more video games, wherein the player imitation model comprises indications of actions taken by a player in each of a plurality of gameplay situations; and
    a computing system in electronic communication with the data store and configured to execute computer-readable instructions that configure the computing system to:
        initiate a hosted instance of a multiplayer video game, wherein the hosted instance of the multiplayer video game includes a plurality of virtual characters interacting in a virtual environment, wherein a first player computing device initially controls a first virtual character, and wherein at least one additional virtual character other than the first virtual character is initially controlled by one or more other player computing devices;
        while the hosted instance of the multiplayer video game is in a first game state, receive player control commands from at least the first player computing device;
        generate a first updated game state for the hosted instance of the multiplayer video game based on at least the player control commands;
        provide information associated with the first updated game state to the one or more other player computing devices;
        update the player imitation model based on the first game state and the player control commands from the first player computing device;
        detect an unexpected lack of control commands originating from the first player computing device over a time period, wherein the unexpected lack of control commands originating from the first player computing device are determined to be unexpected based at least in part on game state information associated with the first virtual character during the time period;

based on the unexpected lack of control commands, switch the first virtual character to be under automated control by the computing system instead of control by the first player computing device;

determine an emulated control command with respect to at least the first virtual character based on the first updated game state and the player imitation model;

generate a second updated game state for the hosted instance of the multiplayer video game based on at least the emulated control command; and provide information associated with the second updated game state to the one or more other player computing devices.

2. The system of claim 1, wherein the computing system is further configured to generate the player imitation model based on automated analysis of a plurality of in-game actions performed as a result of player control commands input by the player over a first time period, wherein the player utilizes the first player computing device and wherein the player imitation model is specific to the player.

3. The system of claim 2, wherein the first time period comprises a plurality of instances of the multiplayer video game, the plurality of instances including the hosted instance of the multiplayer video game.

4. The system of claim 2, wherein the first time period is configurable by the player, wherein the computing system is further configured to generate a user interface that enables the player to select (a) a time period or (b) one or more previous game instances to be considered by the computing system when generating the player imitation model.

5. The system of claim 1, wherein the computing system is further configured to maintain a heartbeat protocol associated with a connection between the computing system and the first player computing device, wherein switching the first virtual character to be under automated control by the computing system is further based at least in part on the heartbeat protocol.

6. The system of claim 1, wherein the computing system is further configured to:

detect that a connection problem between the computing system and the first player computing device is resolved;

based at least in part on the connection problem being resolved, return the first virtual character to be under control of the first player computing device instead of under automated control by the computing system; and generate a third updated game state for the hosted instance of the multiplayer video game based on one or more player control commands from at least the first player computing device.

7. The system of claim 1, wherein the player imitation model is one of a plurality of player imitation models stored in the data store, wherein each of the plurality of player imitation models comprises indications of actions taken by the player in different instances of the multiplayer video game.

8. A computer-implemented method comprising:

under the control of a computer system comprising computer hardware, the computer system configured with computer executable instructions:

initiating an instance of a multiplayer video game, wherein the instance of the multiplayer video game includes a plurality of virtual entities interacting in a virtual environment, wherein a first player computing device initially controls a first virtual entity, and wherein at least one additional virtual entity other than the first virtual entity is initially controlled by one or more other player computing devices;

while the instance of the multiplayer video game is in a first game state, receiving player control commands from at least the first player computing device;

generating a first updated game state for the instance of the multiplayer video game based on at least the player control commands;

providing information associated with the first updated game state to the one or more other player computing devices;

detecting a control input problem associated with the first player computing device, wherein the control input problem comprises an unexpected lack of control commands originating from the first player computing device over a time period, wherein the unexpected lack of control commands originating from the first player computing device are determined to be unexpected based at least in part on game state information associated with the first virtual entity during the time period;

based on the control input problem, determining an emulated control command with respect to at least the first virtual entity based on the first updated game state and a player imitation model, wherein the player imitation model comprises a trained model configured to receive a current game state of the multiplayer video game as input and to output an in-game action or command based on previously observed player behavior;

generating a second updated game state for the instance of the multiplayer video game based on at least the emulated control command; and providing information associated with the second updated game state to the one or more other player computing devices.

9. The computer-implemented method of claim 8, wherein the first virtual entity comprises at least one of a virtual character, a virtual object, a grouping of virtual in-game units, a virtual vehicle, or a virtual structure.

10. The computer-implemented method of claim 8 further comprising:

detecting that a control input problem is resolved;

returning the first virtual entity to be under control of the first player computing device; and generating a third updated game state for the instance of the multiplayer video game based on one or more player control commands from at least the first player computing device.

11. The computer-implemented method of claim 8, wherein the player imitation model is trained at least in part in real time during the instance of the multiplayer video game, wherein at least a first portion of the previously observed player behavior is observed during the instance of the multiplayer video game.

12. The computer-implemented method of claim 11, wherein a second portion of the previously observed player behavior is associated with commands received from the first player computing device in a previously played instance of the multiplayer video game.

13. The computer-implemented method of claim 11, wherein a second portion of the previously observed player behavior comprises behavior of a plurality of players.

14. A non-transitory computer-readable storage medium having stored thereon computer-readable instructions that, when executed, configure a computing system to perform operations comprising:
- initiating an instance of a multiplayer video game, wherein a first player computing device initially controls a first virtual entity in the multiplayer video game, and wherein at least one additional virtual entity other than the first virtual entity is initially controlled by one or more other player computing devices;
- while the instance of the multiplayer video game is in a first game state, receiving player control commands from at least the first player computing device;
- generating a first updated game state for the instance of the multiplayer video game based on at least the player control commands;
- providing information associated with the first updated game state to the one or more other player computing devices;
- detecting an unexpected lack of control commands originating from the first player computing device over a first time period, wherein the unexpected lack of control commands originating from the first player computing device are determined to be unexpected based at least in part on first game state information associated with the first virtual entity during the first time period;
- based on the unexpected lack of control commands, determining an emulated control command with respect to at least the first virtual entity based on the first updated game state and a player imitation model, wherein the player imitation model comprises a trained model configured to receive a current game state of the multiplayer video game as input and to output an in-game action or command based on previously observed player behavior; and
- generating a second updated game state for the instance of the multiplayer video game based on at least the emulated control command.

15. The non-transitory computer-readable storage medium of claim 14, wherein the operations further comprise providing information associated with the second updated game state to the one or more other player computing devices.

16. The non-transitory computer-readable storage medium of claim 14, wherein the operations further comprise:
- detecting that a connection problem is resolved;
- returning the first virtual entity to be under control of the first player computing device; and
- generating a third updated game state for the instance of the multiplayer video game based on one or more player control commands from at least the first player computing device.

17. The non-transitory computer-readable storage medium of claim 14, wherein the player imitation model comprises a plurality of stackable levels that are each configured to determine a confidence score for a different action given the current game state of the multiplayer video game.

18. The non-transitory computer-readable storage medium of claim 17, wherein the player imitation model is configured to output an in-game action associated with a first checked level of the stackable levels that determines a confidence score meeting a threshold with respect to the current game state.

19. The non-transitory computer-readable storage medium of claim 14, wherein the player imitation model comprises a decision tree, a Markov model, or a deep neural network.

20. The non-transitory computer-readable storage medium of claim 14, wherein the unexpected lack of control commands are determined to be unexpected based in further part on a second time period and second game state information during the second time period.

* * * * *